United States Patent
Webb et al.

[11] Patent Number: 5,388,787
[45] Date of Patent: Feb. 14, 1995

[54] AIR IMPERMEABLE PARACHUTE CANOPY WITH OPENING ASSIST

[75] Inventors: David B. Webb; David A. Wright, both of Fort Erie, Canada

[73] Assignee: Irvin Industries Canada Ltd., Fort Erie, Ontario, Canada

[21] Appl. No.: 155,839

[22] Filed: Nov. 23, 1993

[51] Int. Cl.⁶ .............. B64D 17/02; B64D 17/14; B64D 17/18; B64D 17/08

[52] U.S. Cl. .................. 244/145; 244/142; 244/152

[58] Field of Search .............. 244/142, 145, 152

[56] References Cited

U.S. PATENT DOCUMENTS

| | | | |
|---|---|---|---|
| 1,427,771 | 9/1922 | Ball | 244/145 |
| 1,802,325 | 4/1931 | Broadwick | 244/142 |
| 2,447,187 | 8/1948 | Kunkler | 244/142 |
| 2,683,575 | 7/1954 | Heinrich | 244/142 |
| 3,228,636 | 1/1966 | Lemoigne | 244/145 |
| 3,385,539 | 5/1968 | Ewing et al. | 244/142 |
| 3,655,151 | 4/1972 | Ferguson | 244/142 |
| 4,098,475 | 7/1978 | Heinrich | 244/145 |
| 4,117,993 | 10/1978 | Palm et al. | 244/145 |
| 4,117,994 | 10/1978 | Webb | 244/152 |
| 4,588,149 | 5/1986 | Gold | 244/145 |
| 4,623,109 | 11/1986 | Sadeck | 244/152 |
| 5,174,527 | 12/1992 | Kasher | 244/145 |

Primary Examiner—Michael S. Huppert
Assistant Examiner—Virna Lissi Ansley
Attorney, Agent, or Firm—William J. Crossetta

[57] ABSTRACT

This invention relates to annular canopy parachutes having a central cap canopy, in critically spaced arrangement at the central main vent, which assists in providing rapid controlled inflation and decreasing oscillation upon inflation as to allow incorporation of high drag coefficient, generally air impermeable canopy fabric.

29 Claims, 6 Drawing Sheets

AIR IMPERMEABLE PARACHUTE CANOPY WITH OPENING ASSIST

This invention relates to parachutes and more particularly to novel parachutes comprising a generally air impermeable canopy material and an opening assist arrangement for controlling canopy inflation.

Background Of The Invention

In modern military engagements, it is often desirable to position troops by parachute deployment and particularly desirable to deploy parachute troops at the lowest possible above ground level altitude in order to improve landing accuracy and reduce paratrooper and aircraft vulnerability to hostile enemy fire. Complicating low altitude troop deployment is the need to provide an immediate initial canopy opening and a delayed final full inflation. An immediate initial canopy opening is desired which is sufficient to assure adequate drag within a relatively short vertical drop to limit height loss. Such immediate opening should be without creating excessive deceleration loading on the trooper and complete inflation is desirably delayed until the trooper/parachute axis is approaching vertical. A fast full inflation will tend to cause over-inflation of the canopy, with possible subsequent collapse before re-inflation in addition to creating high inflation forces and excessive swing from the vertical, leading to dangerous oscillatory motions. The delayed final inflation must be tuned to occur as the trooper swings to the first vertical position and thus dampen the swing energy for continuing oscillation.

Generally, troop parachute assemblies are of an inverted cone design with canopies being manufactured from a generally air permeable fabric which has a moderate coefficient of drag. Such assemblies are effective at medium and high altitude deployment wherein chute oscillation can be damped during descent, but are problematic in low altitude deployment. The additional need for reduced descent rate dictates the increasing size and bulk of canopies that may be required for high trooper loads, and the inflation problems associated with such large parachute and low vertical distances continues to be a concern for which a solution is needed.

Canopies manufactured from fabrics which are generally air impermeable, have higher drag coefficients than canopies formed from generally air permeable fabrics and thus generally are seen as being capable of slower rates of descent, smaller sizing and less bulk for the same load sizes. Generally however, air impermeable fabrics have been considered inappropriate for controlled troop deployment, being viewed as inherently imparting sudden and significant dynamic impact at canopy opening and having difficult to control descent oscillation tendencies which significantly increase the danger of impact injuries to the paratrooper.

The annular canopy is a canopy design which is generally donut shaped, having a large central opening called the main vent through which air can readily escape. Annular parachute canopies are said to enable slower rates of descent for a given parachute cloth and area and to provide good stability during descent and thus have been proposed for use in troop deployment but have not enjoyed wide success. Though the annular design can provide desirable slower rates of descent and greater stability, it also is seen as having other problems. Generally, annular canopies are considered as slow and/or unpredictably variable in the time they take to reach full inflation and thus are seen as requiring higher altitude deployment to assure successful inflation. They are also seen as generally requiring a lower critical inflation velocity which in turn generally requires lower aircraft speed which may endanger lower altitude aircraft flight. It has been proposed to resolve the variable inflation characteristic of the annular canopy by mechanisms which hold the main vent closed until the parachute fills with air, however, such means have not enjoyed significant commercial success. Thus, the problems associated with the use of annular canopies on low altitude parachutes have persisted and annular canopies have generally not been seriously considered for low altitude troop deployment.

It is proposed that an ideal parachute for low altitude troop deployment is one having a fast initial canopy opening and a delayed final full canopy inflation. The fast initial canopy opening should be sufficient to assure adequate drag within a relatively short vertical drop thus limiting vertical height loss and preferably occurring without creating excessive deceleration loading on the trooper. Final full inflation is desirably delayed to allow the trooper/parachute axis to reach a near vertical orientation, thus reducing the tendency toward oscillatory motion and canopy over-inflation which increase the risk of landing injury and/or canopy collapse. The delayed final inflation is ideally tuned to occur as the trooper swings to a first vertical position and thus will dampen the swing energy for continuing oscillation.

An object of this invention is to provide a novel parachute having an annular canopy particularly suitable for low altitude deployment.

Another object of the invention is to provide a novel parachute having an annular canopy comprising a central cap canopy critically positioned to control inflation of the parachute.

Another object of the invention is to provide an annular parachute canopy formed from a generally air impermeable fabric.

Another object of the invention is to provide a parachute having a reduced descent rate with minimal increase in canopy size or bulk.

A further object of the invention is to provide a means for assisting controlled inflation of a parachute canopy, so as to provide a fast initial inflation with a slowed final inflation in order to control inflation forces and minimize initial oscillation tendencies.

These and other objects of the invention will become apparent from the following recitation of the invention.

SUMMARY OF THE INVENTION

The invention relates to a novel annular canopy parachute, having a critically spaced central domed cap canopy arranged at the central main vent of the annular canopy, which defines an annular vent that assists in rapid controlled initial or supporting inflation and slowed controlled final or full inflation of the annular canopy and so moderates oscillation characteristics upon inflation as to allow incorporation of high drag coefficient, generally air impermeable canopy fabric. In an embodiment of the invention a central cap canopy is critically spaced at the central main vent of the main annular canopy in a manner which so enhances parachute inflation such that the time of initial opening to a supporting inflation level is reduced, and so enhances venting that full canopy inflation is delayed sufficiently to dampen initial oscillation.

In a further embodiment of the invention, stabilizing panels, with inflation pockets, are positioned at the skirt of the annular canopy in such manner as to further enhance the chute deployment by further reducing the time of chute inflation to a supporting inflation level. When combined with the critically spaced central cap canopy in an annular canopy arrangement, such panels act to so temper the incident of full inflation as to reduce the dynamic impact of full inflation of an annular canopy and prevent over-inflation. Thus, the annular canopy parachute of the invention rapidly inflates to a support inflation for low altitude deployment, has a reduced level of oscillation, a reduced dynamic impact, a high drag coefficient and reduced descent rate capabilities, which is inherently stable and so reduced in horizontal glide velocity as to eschew horizontal velocity stabalizing means.

In a still further embodiment of the invention the annular canopy parachute of the invention comprises a combination of modular components which can be conveniently assembled or disassembled for replacement of worn or otherwise damaged components.

The annular main canopy of the invention is generally sized in accord with the contemplated load and generally comprises a plurality of elongated trapezoidal fabric panels or gores, symmetrically arranged about a central axis, with an end along an interior generally circular periphery of the annular form, an opposite end along an exterior periphery which is generally concentric to the interior periphery, the sides of adjacent panels being joined together between the interior and exterior peripheries. It should be understood that upon inflation the exterior and/or interior peripheries take on a generally scalloped appearance. The annular canopy generally comprises main suspension lines extending from about the exterior perimeter of the canopy to an object load and may include suspension tapes or lines generally extending radially outwardly from the interior periphery of the annular canopy, preferably along reinforced joined sides of gores, to the exterior periphery of the annular canopy and downward to the object load.

In a preferred modular unit embodiment, joined adjacent sides of the gores of the annular canopy are generally reinforced, such as with reinforcing parachute tape or the like, with the reinforcing tape or the like extending beyond about the interior and exterior peripheries and comprising attachment loops or other appropriate attachment means for the connection of suspension and/or rigging lines. In such modular arrangement, preferably the reinforcing parachute tape or the like generally extends a sufficient amount from the exterior periphery such that the connection of the main suspension lines is at a point from about 10 to about 30 inches and preferably about 18 inches from the exterior periphery.

Internal rigging lines are generally arranged to connect with main suspension lines and/or parachute tape from about at the exterior periphery of the canopy to about the interior periphery of the canopy. In a preferred modular embodiment of the invention, rigging lines are generally connected at one end at about the point of connection of the main suspension lines to a loop of reinforcing parachute tape or the like extending from the exterior periphery of the annular canopy and at another end to a loop of reinforcing parachute tape or the like extending from and/or at the interior periphery. The length of such rigging lines is generally sized to maintain a distance between the interior and exterior peripheries of the inflated canopy such that the fabric of a gore can inflate to form a crown upon deployment. Preferably, such rigging lines are sized such that at inflation, an apex of an air inflation crown is formed in gores comprising the annular canopy which is above about the interior periphery of the annular canopy during normal vertical descent.

The external perimeter of the annular canopy preferably comprises a net skirt or the like. Generally such skirt comprises a net like structure, preferably conical, with an upper border of the structure connected at the exterior periphery of the annular canopy and a lower border connected at main support lines and/or extensions of reinforcing parachute tape or the like extending from the exterior periphery of the annular canopy. Such skirt is generally arranged to maintain generally circular integrity of the periphery, prevent inversion and/or prevent fouling of the support and/or rigging lines of the annular canopy. Generally, a preferred point at which the lower border of the skirt engages a main support line is a preferred point at which the main suspension lines and rigging lines connect.

The cap canopy comprises a generally circular periphery having a diameter upon inflation generally about the same or smaller than the diameter of the main vent of the annular canopy, and is configured to form a dome when inflated, generally having a scalloped appearance.

Preferably the cap comprises a central exhaust vent at about the center thereof. The periphery of the domed cap canopy is generally connected to the annular main canopy such that the periphery of the cap is in spaced apart relationship to the interior periphery of the annular canopy upon parachute deployment, thus forming an annular vent therebetween. Such annular vent comprises a primary control of the inflation rate of the parachute.

The attachment of the cap canopy is generally by means of a plurality of cap suspension lines extending from about the exterior peripheral border of the cap canopy to about the interior periphery of the annular canopy. The cap suspension lines are sized such that the space between peripheries of the canopies is critically adjusted for controlled venting of inflation air therebetween, primarily for control of the inflation rate of the overall parachute.

The cap is of domed configuration and generally comprises a plurality of triangular or trapezoidal fabric panels or gores, symmetrically arranged about a central axis, preferably with one end along an interior periphery defining an exhaust vent, the other end defining an exterior periphery of the cap canopy and being preferably reinforced with parachute tape or the like along sides of adjacent joined gores extending between the interior and exterior periphery.

The domed cap and the annular main canopy are connected by suspension lines such that the periphery of the canopy cap is critically spaced to comprise an annular air vent gap of from about 6 to about 30 inches between the interior periphery of the annular canopy and the exterior periphery of the domed cap canopy, depending upon canopy size and rate of overall canopy inflation required.

In a preferred modular embodiment, joined adjacent sides of gores of the cap canopy are generally reinforced, such as with reinforcing parachute tape or the like, with the reinforcing tape or the like extending from a joined border of a first set of gores, through a central crown to a joined border of a second set of oppositely positioned joined gores. Such reinforcing tape or the like generally extends from a point on the exterior peripheral border to an opposite point and comprises loops and/or other suitable connecting means.

Preferably, ends of the parachute tape extend from the periphery of the domed canopy a sufficient length to comprise the suspension means defining the annular main vent and connect with corresponding loops along the interior border of the annular canopy. Suspension lines may however, be arranged between parachute tape loops of the exterior peripheral border of the cap canopy and corresponding parachute tape loops of the interior periphery of the annular canopy and can be conveniently replaced, adjusted or the like. Similarly, suspension lines may be connected to connecting means at the interior peripheral border of the cap canopy and thereafter interconnected so that they extend generally radially outwardly from a central exhaust vent to their point of connection at the peripheral border of the cap canopy.

In a further modular embodiment, suspension lines or tapes extend radially outwardly from a central exhaust vent of the cap canopy to the interior peripheral border of the cap canopy, along reinforced joined sides of gores, to connecting means at the interior periphery of the annular canopy.

It is preferred that the spacing between peripheries of the canopies be generally consistent about the perimeter of the cap but such is not required. Preferably, the diameter of the canopy cap, upon inflation, is about the same or less than the diameter of the interior periphery of the inflated annular main canopy.

The adjustment of spacing of the air vent gap between the cap canopy periphery and the annular main canopy, within the prescribed range, is generally dependent upon the initial rate of inflation required. Generally, for a 350 pound object load bearing utility wherein the main annular canopy is a generally air impermeable fabric, the diameter of the internal perimeter of the inflated annular canopy is from about seven to about nine feet and the gap between the central cap canopy and the internal perimeter of the annular main canopy is from about six to about thirty inches, preferably from about six to about twenty-four and most preferable from about six to about eighteen inches.

Generally it is preferred that the material of the annular and cap canopies comprise a generally air impermeable fabric. It should be understood, that by generally air impermeable fabric and/or material is meant fabric that is generally impermeable to the flow of air therethrough at the contemplated conditions of use and is not meant to be limited to material which precludes all flow of air therethrough under any condition of use. It should also be understood that it is contemplated as within the invention to use generally air permeable parachute fabric in the novel parachute of the invention, canopies having different air permeable and/or air impermeable characteristics or canopies comprising gores of varying air permeability or impermeability.

The stabilizing panel contemplated for use with the invention comprises a generally triangular shaped panel, preferably having a generally isosceles triangular shape, in inverted arrangement along the exterior periphery of a main parachute canopy such that a base side thereof is connected along the periphery of the canopy and the two other sides extend downward from the periphery of the inflated canopy and meet at an angle preferably along a main support line and/or reinforcing parachute tape extension connecting thereto. Generally the base of the panel is not connected throughout its length to the canopy, but is connected at either end of a gore in such manner as to provide a cleavage in the inflated parachute canopy at the joined sides of gores at inflation. Generally a plurality of the stabilizing panels are contemplated for use with a parachute canopy, being arranged along the canopy perimeter with the panels having an interior facing and an exterior facing surface. Generally the plurality of panels are similarly sized, but such is not essential to the invention. It should be understood that the panels can be separately connected to the periphery of the canopy or can be integral therewith.

Generally, the triangular panels are arranged so that the sides converge at a point adjacent a main suspension line of the parachute and generally the panels are configured to attach to a loop or the like on the interior facing surface, which is comprised in the main seam tape structure, through which a main suspension line engages. In a particularly preferred embodiment, a plurality of triangular stabilizing panels are arranged with their bases along about the exterior periphery of the annular canopy of the invention, the panels are formed from fabric wherein the warp of the fabric is generally parallel to a side of the panel and the interior facing surface of the panel comprises a loop through which reinforcing parachute tape extending from the annular canopy runs to connection with a main suspension line.

In a preferred embodiment the base of the panel is not connected throughout its length to the periphery of the canopy, particularly not in the medial portion of the base adjacent the joined sides of adjacent gores. In such preferred arrangement, the sides of adjacent gores comprising the annular canopy are joined so that upon inflation of the canopy the exterior perimeter appears as being scalloped with cleavage at about the joined border of adjacent gores. End portions of the base of a panel are connected to adjacent gores such that upon inflation of the canopy, the base appears as spanning the cleavage at the joinder of adjacent gores, comprising an opening at the cleavage through which air can flow. In addition to providing stability during descent, such panels also act to slow down the final inflation of the annular portion of the canopy.

In a preferred embodiment of the invention, one or more of a plurality of stabilizing panels comprise an air inflation pocket therein having an opening thereto on an exterior facing surface of the panel which is arranged such that air rushing along the exterior facing surface of a non-inflated parachute can enter the pocket. Such pockets are dominant in the early inflation stage of the canopy and act to initially quickly open the mouth of the annular canopy to establish the noted fast initial supporting inflation level of the canopy. This early dominance is canceled out by the triangular stabilizing panels inflation retarding action during the final inflation of the annular portion of the parachute. Generally the opening is elongated in a direction parallel to the base side of the panel and most preferably a boundary defining the elongation of an opening comprises a curvature along its length which is convex to the angle of the converging sides opposite the base side.

It should be understood that the stabilizing panels of the present invention can be used on a wide variety of canopies of the prior art and are not limited to use with the preferred annular canopy of the invention.

These and other features and advantages of the invention will become apparent to those skilled in the art upon a reading of the following detailed description when taken in conjunction with the drawings wherein there is shown and described an illustrated embodiment of the invention.

BRIEF DESCRIPTION OF THE DRAWINGS

In the following detailed description, reference will be made to the attached drawings in which.

DETAILED DESCRIPTION OF THE INVENTION

Figure 1:
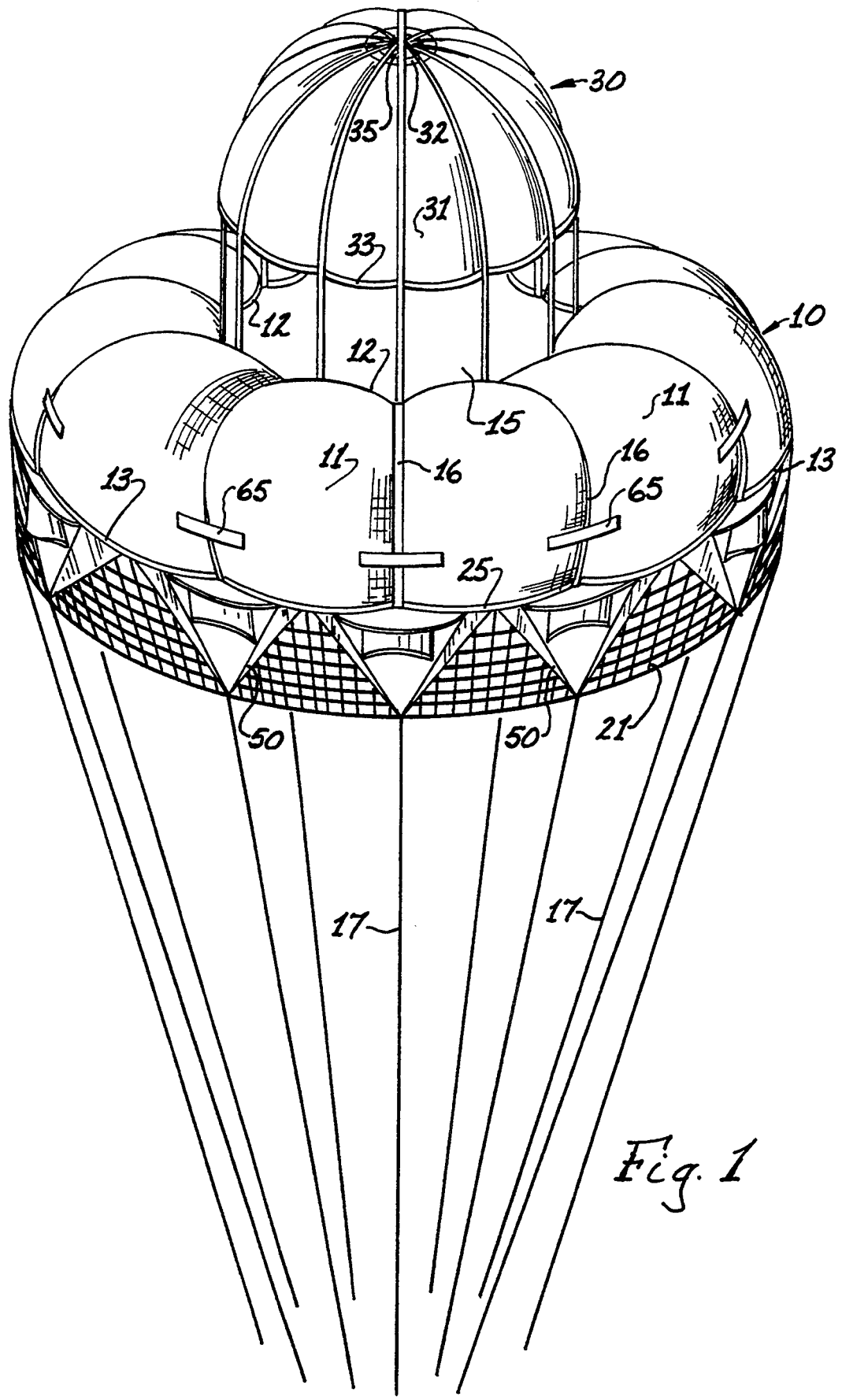
FIG. 1 is a perspective view of a low altitude annular canopy parachute of the present invention.
Figure 2:
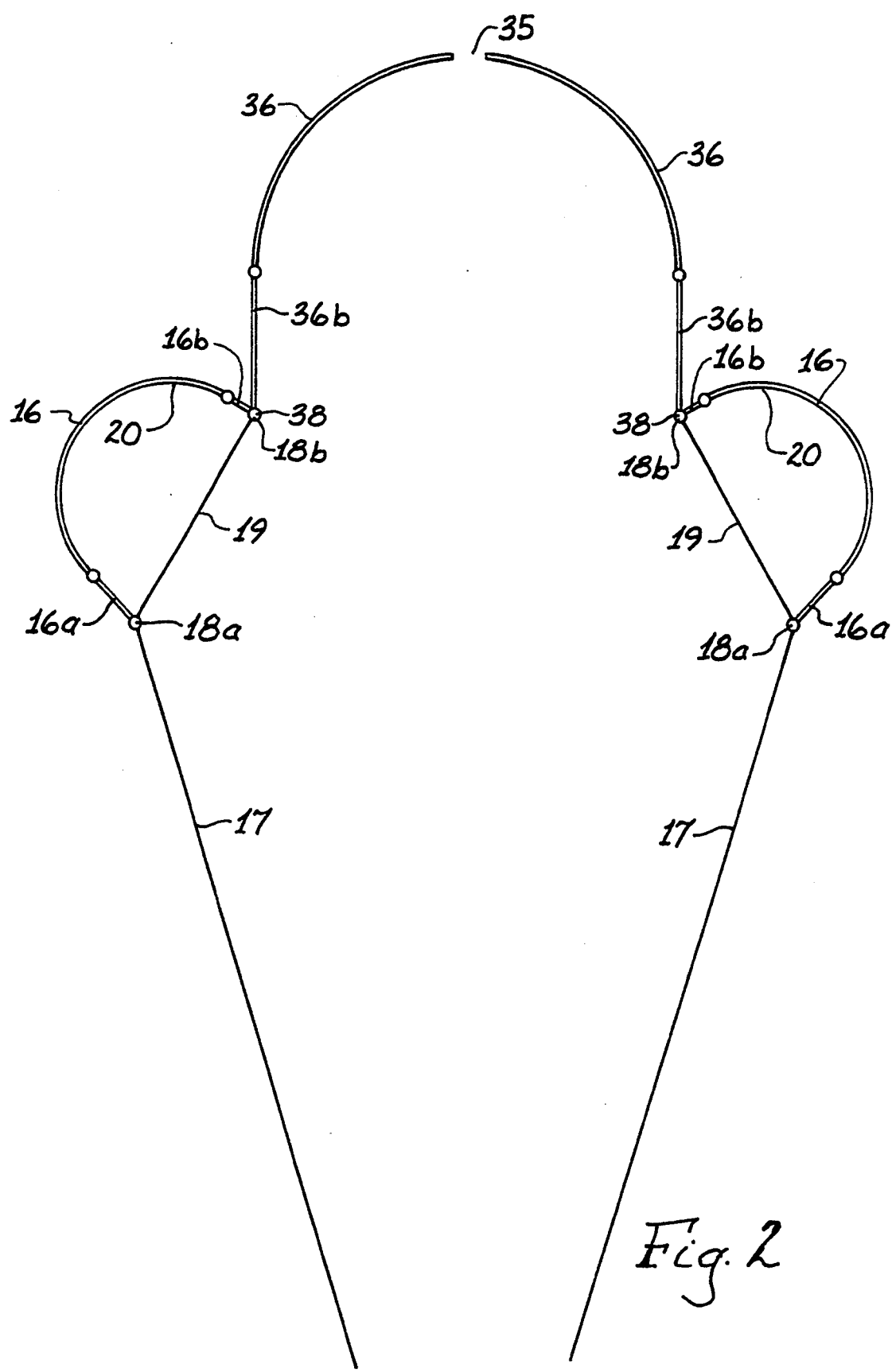
FIG. 2 is a diagrammatic view of an annular parachute of the present invention.
Figure 3:
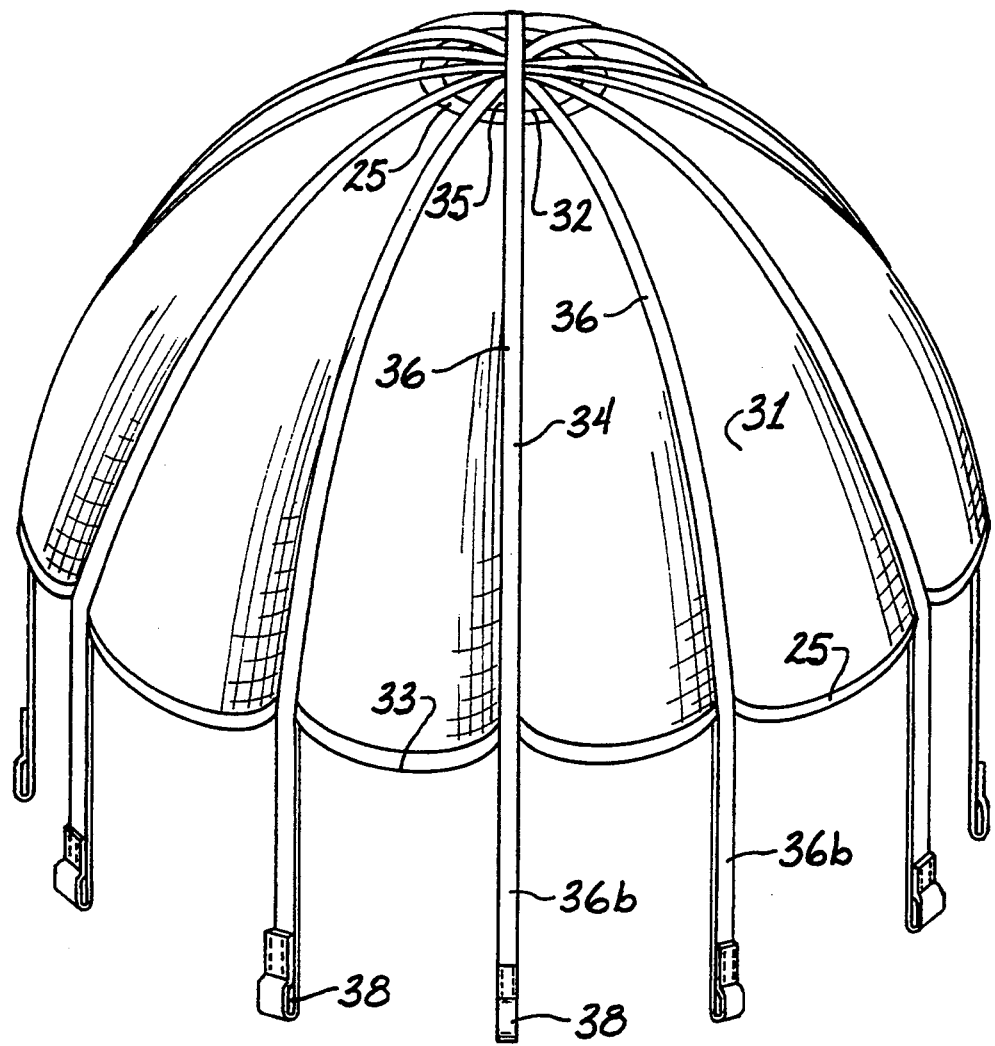
FIG. 3 is a perspective view of a center domed canopy of the parachute of the present invention.

Referring to the drawings and particularly to FIGS. 1-5 wherein is shown an inflated annular canopy parachute of the invention comprising an annular canopy 10, having a main annular vent 15, domed cap canopy 30, net skirt 21, stabilizing panels 50 and main suspension lines 17 extending to an object load which is not shown.

Annular canopy 10 is the main canopy and at inflation is generally of a conical configuration with a pulled-down interior peripheral border 12 defining a border of a central main vent 15. The annular canopy comprises a plurality of main canopy gores 11, which are arranged about main annular vent 15 to form interior peripheral border 12 and exterior peripheral border 13 of the annular canopy. The main canopy gores are generally trapezoidal in configuration and sides of adjacent gores are connected such as by sewing or the like to form seams which are preferably reinforced with parachute line tape 16. Ends 16a of reinforcing parachute line tape 16 are illustrated as extending from exterior peripheral border 13 and comprising loops 18a for attachment of main suspension lines 17 which extend to the object load. Ends 16b of parachute line tape 16 extend from interior peripheral border 12 and comprise loops 18b for attachment of cap canopy suspension means. Interior peripheral border 12 and exterior peripheral border 13 are shown as comprising reinforcing parachute skirt tape 25.

It should be understood that although main canopy suspension lines 17 are illustrated as connected to loops 18a of parachute line tape ends 16a of parachute line tape 16 which generally run along the seams of joined gores, it is also contemplated that various alternative main canopy suspension line configurations and/or connections are useful in the invention. For example, suspension lines may be connected to the main annular canopy through loops along the exterior peripheral border of the canopy or the like, or can extend about the canopy, such as along gore seams, to the interior peripheral border, and may even extend further comprising the suspension means of the domed cap canopy and/or be arranged about the domed canopy to the top crown of the domed cap canopy.

Rigging lines 19 are illustrated as extending from loops 18b on ends 16b of parachute line tape 16, at about interior peripheral border 12 of main annular canopy 10, to loops 18a on ends 16a of parachute line tape 16 to which also are connected main suspension lines 17, generally by Larkshead type knots for ease of assembly. The length of rigging lines 19 is generally sized so that upon inflation of the main annular canopy at a desired object load range, an apex of inflation crown 20 is formed in adjacent gores of the annular canopy which is positioned above interior peripheral border 12 of the annular canopy. It should be understood that although the illustrated embodiment is a preferred embodiment, the rigging lines may also be connected at other points along end 16a of the parachute line tape or at suitable other points along the suspension line.

Figure 5:
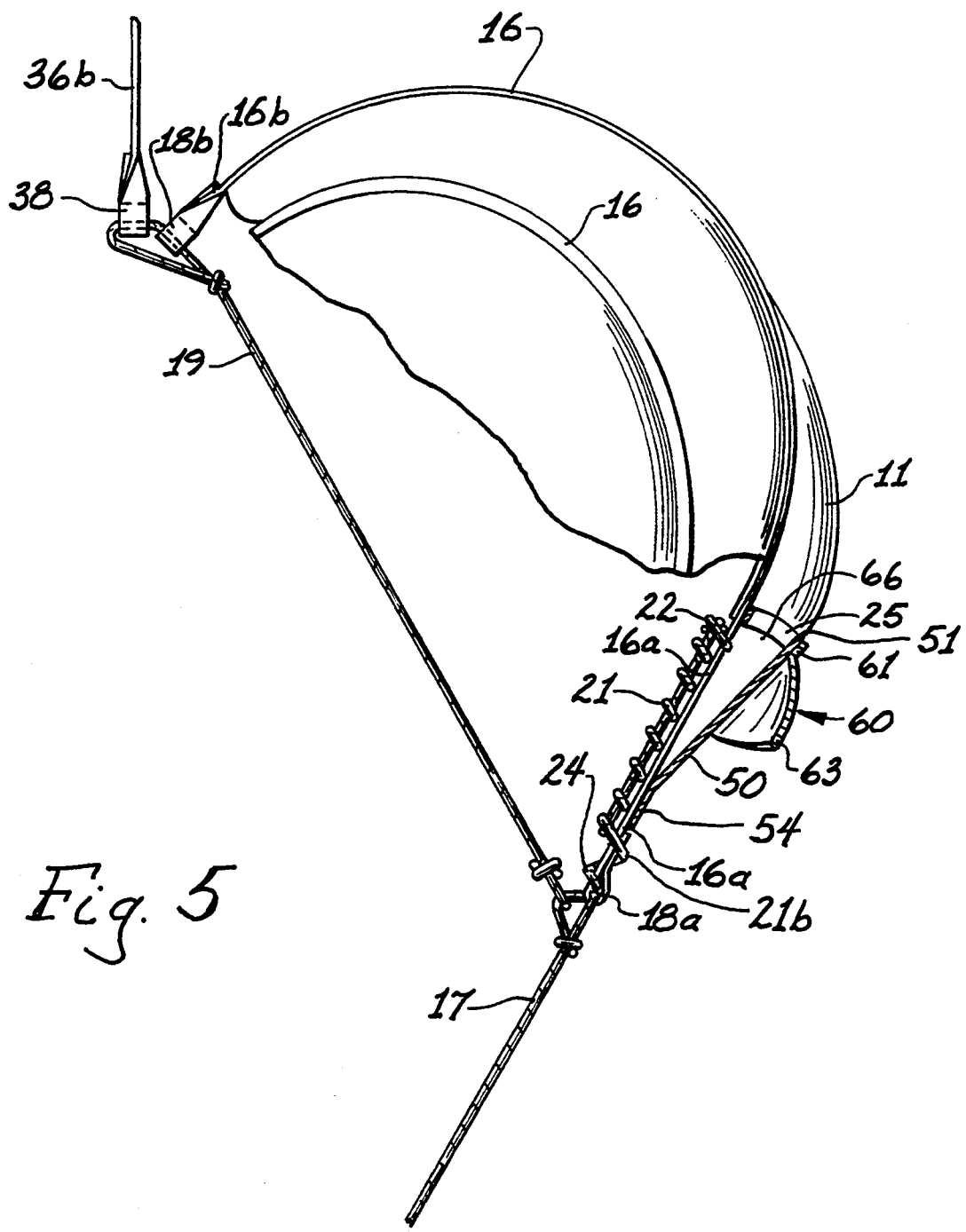
FIG. 5 is a partial sectional view of the canopy of FIG. 4, taken along about line 5—5'.

FIGS. 1 and 5, specifically illustrate net skirt 21, arranged to reduce the possibility of suspension line fouling and/or canopy inversion. Generally the net skirt comprises from about 2.5 to about 4.5 inch grid spacing and is arranged so that upon inflation of the annular canopy the skirt forms a downward extending inverted cone. Generally upper border 22 of net skirt 21 is connected to peripheral border 13 of the annular canopy and the skirt extends downward from about 10 to about 30 inches and preferably about 18 inches from exterior peripheral border 13 of annular canopy 10. Generally it is preferred that ends 16a of parachute line tape 16 extend sufficiently from peripheral border 13 so that lower border 21b of net skirt 21 can be conveniently connected through net border line 24 with rigging line 19 and suspension line 17 at loop 18a.

Domed cap canopy 30 is generally of the conical variety and comprises a plurality of interconnected cap gores 31, which are arranged about exhaust vent 35 and form interior peripheral border 32 and exterior peripheral border 33 of the cap canopy. The cap gores are generally trapezoidal and/or generally triangular in configuration and their interconnected borders 34 are generally sewn and preferably reinforced with parachute line tape. In the illustrated embodiment of FIG. 3, the interior peripheral border and exterior peripheral border are shown as being reinforced with parachute skirt tape 25 and interconnected borders of cap gores of the cap canopy comprise seams which are shown as being reinforced with parachute line tape 36 or the like. In the illustrated embodiment, parachute line tape is shown arranged in a preferred embodiment wherein a continuous piece 36a is arranged to reinforce a seam among a first set of adjacent gores, extend through the crown and reinforce a seam among a second set of adjacent gores, with opposite ends 36b comprising loops 38 for attachment.

In the illustrated preferred embodiment, ends 36b of parachute line tape 36 are shown as being extended and comprising loops 38 which connect to loops 18b of the annular canopy, with ends 36b defining the sizing of the main annular vent. It should be understood that parachute line tape 36 may comprise shortened ends and that cap canopy suspension lines may be arranged between loops at their end and loops 38 which define the sizing of the main annular vent. Similarly, crown suspension lines may extend radially outwardly from the crown and about the canopy to connect with loops at the interior peripheral border of the annular canopy. It should be understood that diverse alternative cap canopy configurations and/or suspension line connections are contemplated for use in the invention. For example, cap canopy 30 may be formed without a central exhaust vent and/or without continuous tape between opposing sets of gores.

Figure 4:
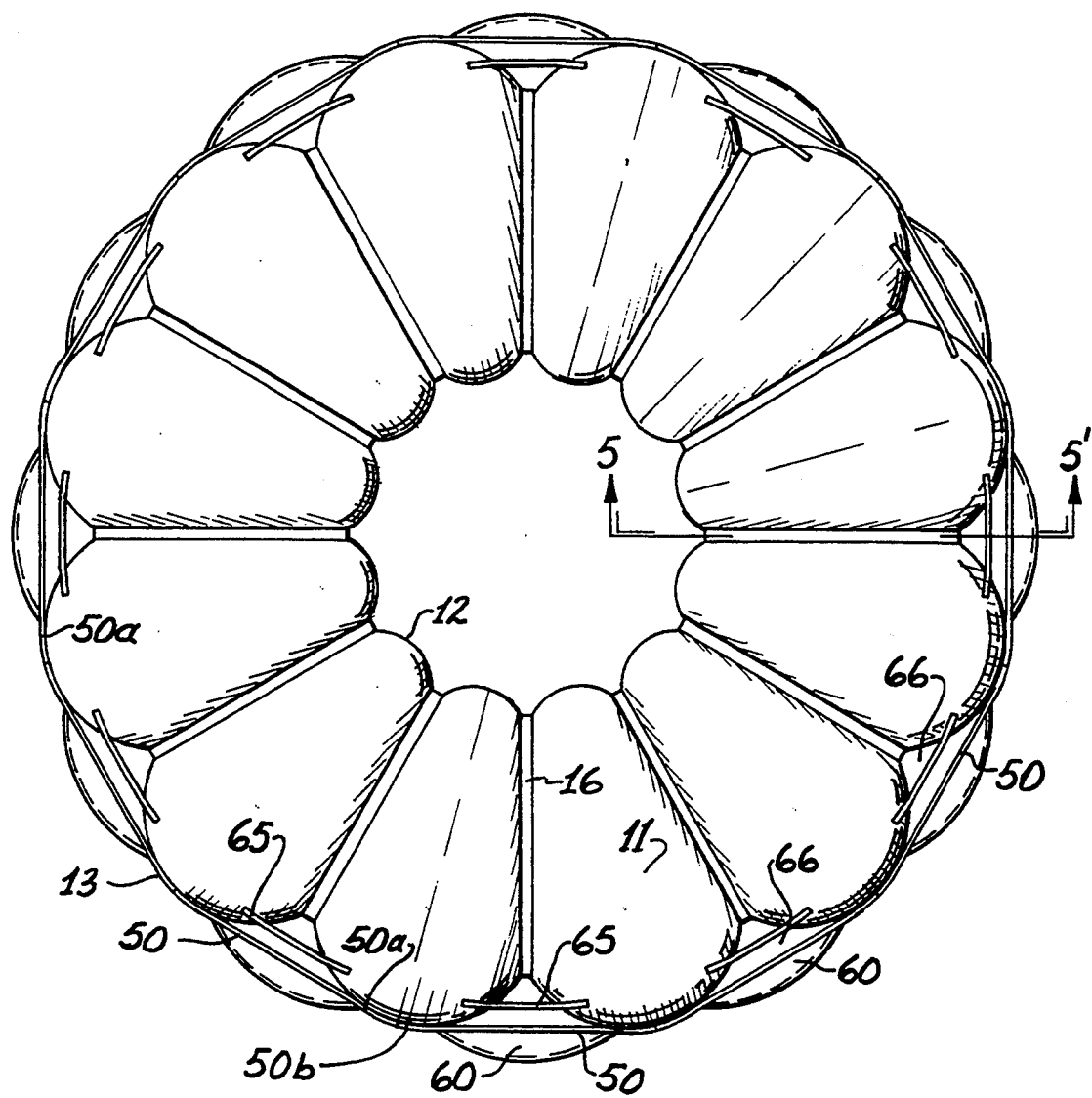
FIG. 4 is a top elevational view of the canopy of FIG. 1.

FIG. 4, comprises an elevational view of annular canopy 10 with dome canopy 30 being removed. This view is intended to illustrate the generally preferred arrangement of stabilizing panels 50 about the exterior perimeter of an annular canopy and illustrate the attachment of ends 50a and 50b of the base of the triangular panels to adjacent gores to define an opening 66 at the cleavage through which air may flow. In the illustrated embodiment, spanning bands 65 are also provided which can act to assist in maintaining the desired cleavage and reduce pulsing of the canopy during descent.

Inflation pockets 60 are illustrated in FIG. 4 as being inflated to show the intended effect of the pockets in opening the annular canopy. It should be understood that generally it is preferred that the fabric of the panel and the pocket be sized so that at full inflation of the annular canopy the panel will be flattened, as shown, in the span between its points of attachment to the gores and the pocket and opening thereto will be flattened against the panel so as to tend to close the opening to the pocket and discharge inflation of the pocket.

Referring now particularly to FIG. 5, therein is shown the relationship of the annular canopy, parachute line tape, rigging line, suspension line, skirt, stabilizing panel and inflation pocket as seen along about line 5—5′ of FIG. 4 at a seam between gores. Gore 11 comprises parachute line tape 16 along its seamed border with an adjacent gore (not shown), having end 16a extending from exterior peripheral border 13 and end 16b extending from interior peripheral border 12. End 16b comprises loop 18b which is shown as connected with loop 38 at end 36b of parachute line tape 36 extending from domed canopy 30. End 16a comprises loop 18a which is shown as connected with suspension line 17 and an end of rigging line 19. Another end of rigging line 19 connects with loop 18b and loop 38. Triangular stabilizing panel 50 is connected through its base 51 at skirt tape 25 along the perimeter of gore 11 and to end 16a at 54. Inflation pocket 60 is joined along its base side 61 to base 51 of the panel and side 63 of the inflation pocket forms the border of the opening to the pocket. Skirt 21 is shown as connected to end 16a at lower border 24 and upper border 22.

Figure 6:
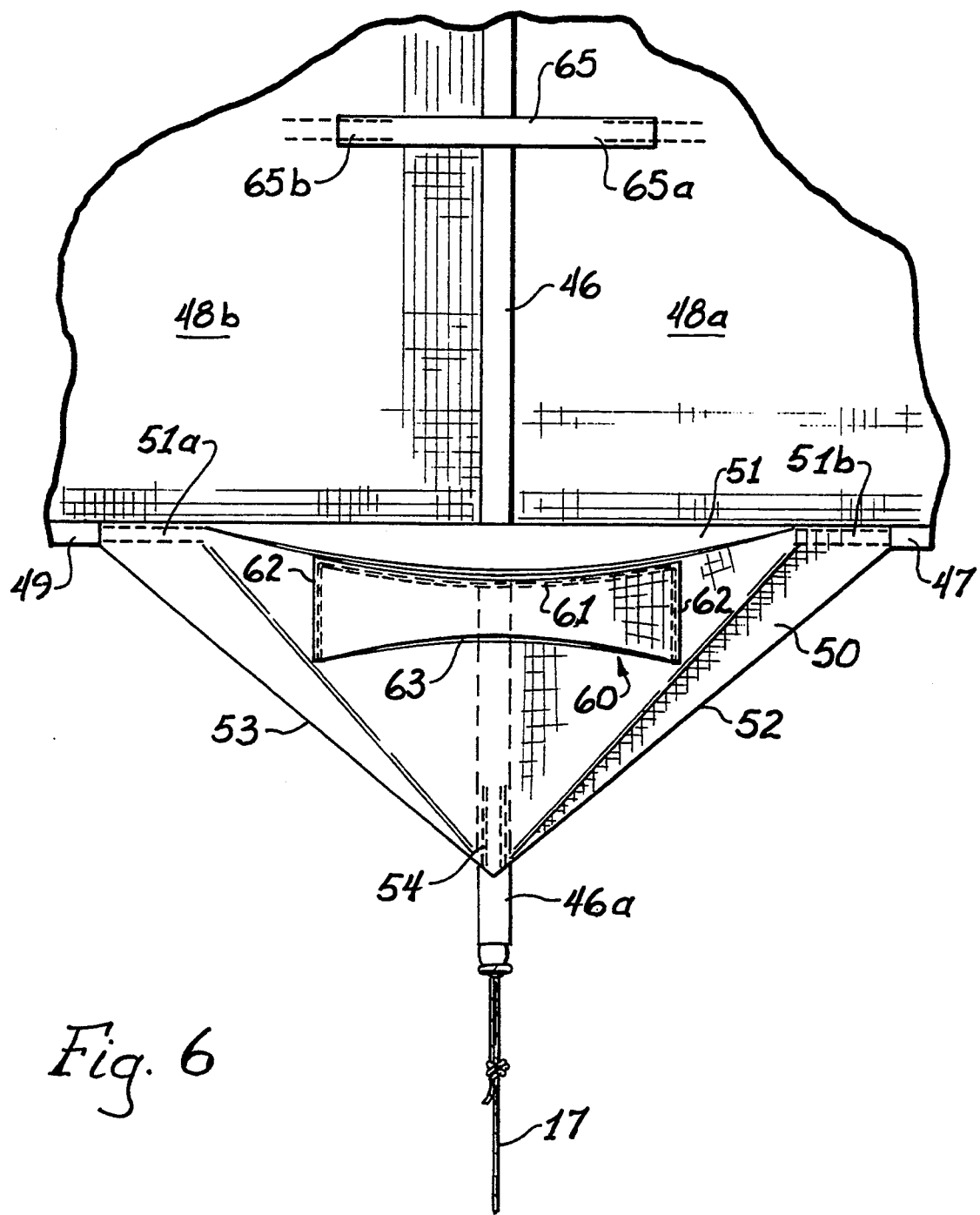
FIG. 6 is an enlarged fragmentary sectional view of an annular canopy with stabilizing panel of the invention.

Referring now to FIG. 6, adjacent joined gores 48a and 48b of a parachute canopy comprising a generally triangular stabilizing panel 50 of the invention is shown as being arranged along exterior peripheral border 49 of an annular canopy formed by the joined gores. Triangular panel 50 comprises base 51 which is reinforcingly sewn through parachute skirt tape 47 at 51a and 51b along the peripheral border and sides 52 and 53 which meet along ends 46a of reinforcing parachute line tape 46 and are sewn thereto at 54.

Inflation pocket 60 is illustrated as being a generally rectilinear envelope formed by joining sides 62 and base 61 of a generally rectangular panel to stabilizing panel 50, with side 63 comprising a border forming an opening to the pocket. Side 63 is preferably generally convex curved in relationship to the angle formed by the meeting of sides 52 and 53 of panel 50 and generally is reinforced with parachute skirt tape or the like. Base border 61 and sides 62 are generally sewn along their length and generally also reinforced with parachute skirt tape or the like. Spanning band 65 is illustrated as being arranged spanning gores 48a and 48b to assist formation of the intended cleavage upon inflation and is shown as being sewn to reinforced areas of the gores at 65a and 65b.

We claim:

1. A low altitude parachute comprising:
   an annular main canopy having a plurality of gores, arranged generally symmetrically about a central axis and joined along adjacent borders to form an annular configuration comprising an interior periphery defining a central main vent, and an exterior periphery generally concentric with said interior periphery;
   a cap canopy, arranged adjacent said central main vent of said annular canopy, comprising a plurality of further gores arranged generally symmetrically about said central axis and joined along adjacent borders to define an exterior periphery spaced from said interior periphery of said annular canopy;
   a plurality of suspension lines, connecting with said exterior periphery of said annular canopy, in spaced apart relationship, said suspension lines being arranged to support an object along about a vertical axis of said annular canopy when said parachute is inflated;
   a plurality of rigging lines, connecting with said interior periphery of said annular canopy, in spaced apart relationship, said rigging lines extending radially outwardly from said interior periphery and connecting with said suspension lines;
   a plurality of canopy suspension means, connecting with said exterior periphery of said cap canopy in spaced apart relationship, said means being arranged to connect with said interior periphery of said annular canopy and being sized to maintain said exterior periphery of said cap canopy spaced from about 6 to about 24 inches from said interior periphery of said annular canopy when said parachute is inflated.

2. The parachute of claim 1 wherein said rigging lines are sized such that at inflation of said annular canopy, gores of said annular canopy inflate upwardly defining an apex of an air inflation crown which is positioned higher than said interior periphery of the inflated annular canopy.

3. The parachute of claim 1 wherein said cap canopy comprises a central air exhaust vent.

4. The parachute of claim 1 wherein said gores of said annular canopy comprise a generally air impermeable fabric.

5. The parachute of claim 1 comprising a plurality of generally triangular stabilizing panels arranged about said exterior periphery of said annular canopy with a base side thereof being arranged at about said periphery.

6. The parachute of claim 5 wherein said triangular stabilizing panels are generally isosceles shaped.

7. The parachute of claim 5 wherein a base side of a panel spans a cleavage formed at inflation of the parachute adjacent the border of joined gores.

8. The parachute of claim 5 wherein a stabilizing panel comprises an air inflation pocket arranged to accept air flowing along an exterior facing surface of said stabilizing panel.

9. The parachute of claim 8 wherein said pocket comprises an opening on an exterior facing surface of the panel, said opening comprising an elongated border extending generally parallel to the base side of said panel.

10. The parachute of claim 9 wherein said elongated border of said pocket is curved generally convex to an angle formed by a convergence of downward extending sides of the panel.

11. The parachute of claim 1 wherein said joined borders of said gores of said annular canopy comprise reinforcing means having ends which extend from said exterior periphery of said annular canopy and connect with said suspension lines.

12. The parachute of claim 11 wherein said reinforcing means comprise parachute reinforcing tape means.

13. The parachute of claim 11 wherein said reinforcing means comprise loop means.

14. The parachute of claim 11 wherein said reinforcing means comprise ends at about the interior periphery of said annular canopy which connect with said cap canopy suspension means.

15. The parachute of claim 1 wherein joined borders of said gores of said cap canopy comprise reinforcing means having ends which extend from the exterior periphery of said cap canopy.

16. The parachute of claim 15 wherein said ends comprise said cap suspension means which connect with said interior periphery of said annular canopy.

17. The parachute of claim 1 wherein said plurality of spaced apart main suspension lines extend radially outwardly from said interior periphery of said annular canopy, along said border of joined gores and downward from said exterior periphery of said annular canopy to said object.

18. The parachute of claim 1 wherein said spaced apart rigging lines engage said main suspension lines from about 10 to about 25 inches from said exterior periphery of said annular canopy.

19. The parachute of claim 1 wherein said plurality of spaced apart cap canopy suspension means extend radially inward from said exterior periphery of said cap canopy, along a plurality of borders of joined further gores comprising said cap canopy and interconnect at about the central axis of said cap canopy.

20. The parachute of claim 19 wherein said suspension means comprise parachute tape arranged to reinforce the joined borders of said further gores.

21. The parachute of claim 20 wherein said parachute tape extends from a first suspension means extending from the exterior periphery of the cap canopy through the central axis of said cap canopy to a second suspension means extending from said exterior periphery of said cap canopy.

22. In a parachute canopy having a plurality of gores arranged generally symmetrically about a central axis, joined along adjacent borders to define an exterior periphery and having a plurality of suspension lines connecting with said exterior periphery, in spaced apart relationship the improvement comprising a plurality of triangular stabilizing panels arranged about said exterior periphery of said canopy, wherein a triangular panel comprises a base, adjacent sides and an included angle between adjacent sides arranged opposite said base, said base of said triangular panel being arranged at about said periphery of said canopy and said included angle being arranged adjacent a suspension line.

23. The parachute of claim 22 wherein a triangular stabilizing panel is generally isosceles shaped.

24. The parachute of claim 22 wherein a stabilizing panel comprises an air inflation pocket arranged to accept air flowing along an exterior facing surface of said stabilizing panel.

25. The parachute of claim 24 wherein said pocket comprises an opening on an exterior facing surface of the panel, said opening comprising an elongated border extending generally parallel to the base side of said panel.

26. The parachute of claim 25 wherein said elongated border is curved generally convex to an angle formed by a convergence of downward extending sides of the panel.

27. The parachute of claim 22 comprising a generally air impermeable fabric.

28. The parachute of claim 1 comprising a band, spanning a joined border of adjacent gores of said annular canopy, and being connected to said adjacent gores above about said exterior periphery of said annular canopy.

29. The parachute canopy of claim 22 wherein a plurality of gores is arranged about a central axis and joined along adjacent borders to form a generally circular canopy, said canopy comprising a band, spanning a joined border of adjacent gores of said canopy and being connected to said adjacent gores above about the exterior periphery of said canopy.

* * * * *